(12) United States Patent
Anderton et al.

(10) Patent No.: US 6,894,636 B2
(45) Date of Patent: May 17, 2005

(54) IMAGING SYSTEM AND METHOD

(75) Inventors: Rupert N Anderton, Malvern (GB);
Peter R Coward, Malvern (GB); Roger Appleby, Malvern (GB)

(73) Assignee: Qinetiq Limited, Farnborough (GB)

( * ) Notice: Subject to any disclaimer, the term of this patent is extended or adjusted under 35 U.S.C. 154(b) by 237 days.

(21) Appl. No.: 10/032,694

(22) Filed: Jan. 2, 2002

(65) Prior Publication Data

US 2003/0189510 A1 Oct. 9, 2003

(30) Foreign Application Priority Data

Nov. 30, 2001 (GB) .............................. 0128659

(51) Int. Cl.$^7$ ............................ G01S 13/89; G01V 3/12

(52) U.S. Cl. ............................ 342/22; 342/27; 342/90; 342/179

(58) Field of Search ............................ 342/22, 27, 90, 342/179, 180, 195, 197

(56) References Cited

U.S. PATENT DOCUMENTS

| | | | | |
|---|---|---|---|---|
| 3,713,156 A | * | 1/1973 | Pothier ........................ | 342/22 |
| 5,081,456 A | * | 1/1992 | Michiguchi et al. .......... | 342/22 |
| 5,557,108 A | * | 9/1996 | Tumer et al. .......... | 250/390.04 |
| 5,557,283 A | * | 9/1996 | Sheen et al. ................ | 342/179 |
| 6,242,740 B1 | * | 6/2001 | Luukanen et al. .......... | 250/353 |
| 6,353,224 B1 | * | 3/2002 | Sinclair et al. .......... | 250/336.1 |
| 6,359,582 B1 | * | 3/2002 | MacAleese et al. .......... | 342/22 |
| 6,480,141 B1 | * | 11/2002 | Toth et al. .................... | 342/22 |
| 2002/0130804 A1 | * | 9/2002 | McMakin et al. ............ | 342/22 |

FOREIGN PATENT DOCUMENTS

JP 10148673 A * 6/1998

OTHER PUBLICATIONS

"Concealed weapon detection using microwave and millimeter wave sensors", McMillan, R.W.; Currie, N.C.; Ferris, D.D., Jr.; Wicks, M.C.; Microwave and Millimeter Wave Technology Proceedings, 1998, p. 1–4.*

"Signal and image processing for crime control and crime prevention", Hackwood, S.; Potter, P.A.; Image Processing, 1999. ICIP 99, p. 513–517 vol. 3.*

"FMCW radar for hidden object detection", Olver, A.D.; Cuthbert, L.G.; Radar and Signal Processing [see also IEE Proceeding Radar, Sonar and Navigation], IEE Proceedings F, vol.: 135 Issue: 4, Aug. 1988, p. 354–361.*

"Privacy algorithm for cylindrical holographic weapons surveillance system", Keller, P.E.; McMakin, D.L.; Sheen, D.M.; McKinnon, A.D.; Summet, J.W.; IEEE Aerospace and Electronics Systems Magazine, vol. 15 Issue: 2, Feb. 2000, p. 17–24.*

(Continued)

Primary Examiner—John B. Sotomayor
(74) Attorney, Agent, or Firm—Nixon & Vanderhye P.C.

(57) ABSTRACT

A system for imaging the contents of containers includes an imager arranged to receive millimetre wave radiation from a reception volume through a receive antenna wherein, in use, the container is moving relative to the receive antenna, the reception volume is positioned such that the relative movement causes the reception volume to move through the container; data from the antenna is recorded as the reception volume moves through the container, and an image of the contents of the container is built up from the recorded data. The system is particularly suitable for imaging containers mounted on vehicles. The imager may advantageously be mounted in a portal, allowing convenient and controllable relative positioning of the container, and allowing the relative speed to be controlled or measured easily. The invention allows 3D or pseudo 3D images to be produced to aid identification of container contents. The invention also includes a method for imaging.

20 Claims, 8 Drawing Sheets

OTHER PUBLICATIONS

"Detecting Concealed Weapons: Technology Research at the National Institute of Justice", Peter L. Nacci; Lee Mockensturm; American Correctional Association, CT, Jul. 2001 vol. 63, No. 4.*

"Passive millimeter wave imaging growing fast", Yvonne Carts–Powell, SPIE Web OE Reports, 2000.*

"JUSTNET: Justice Technology Information Network" website: http://www.nlectc.org/virlib/InfoDetail.asp?intInfoID.*

"Millivision" website: http//:www.angelfire.com/nj3/sound-weapon/millivision.*

* cited by examiner

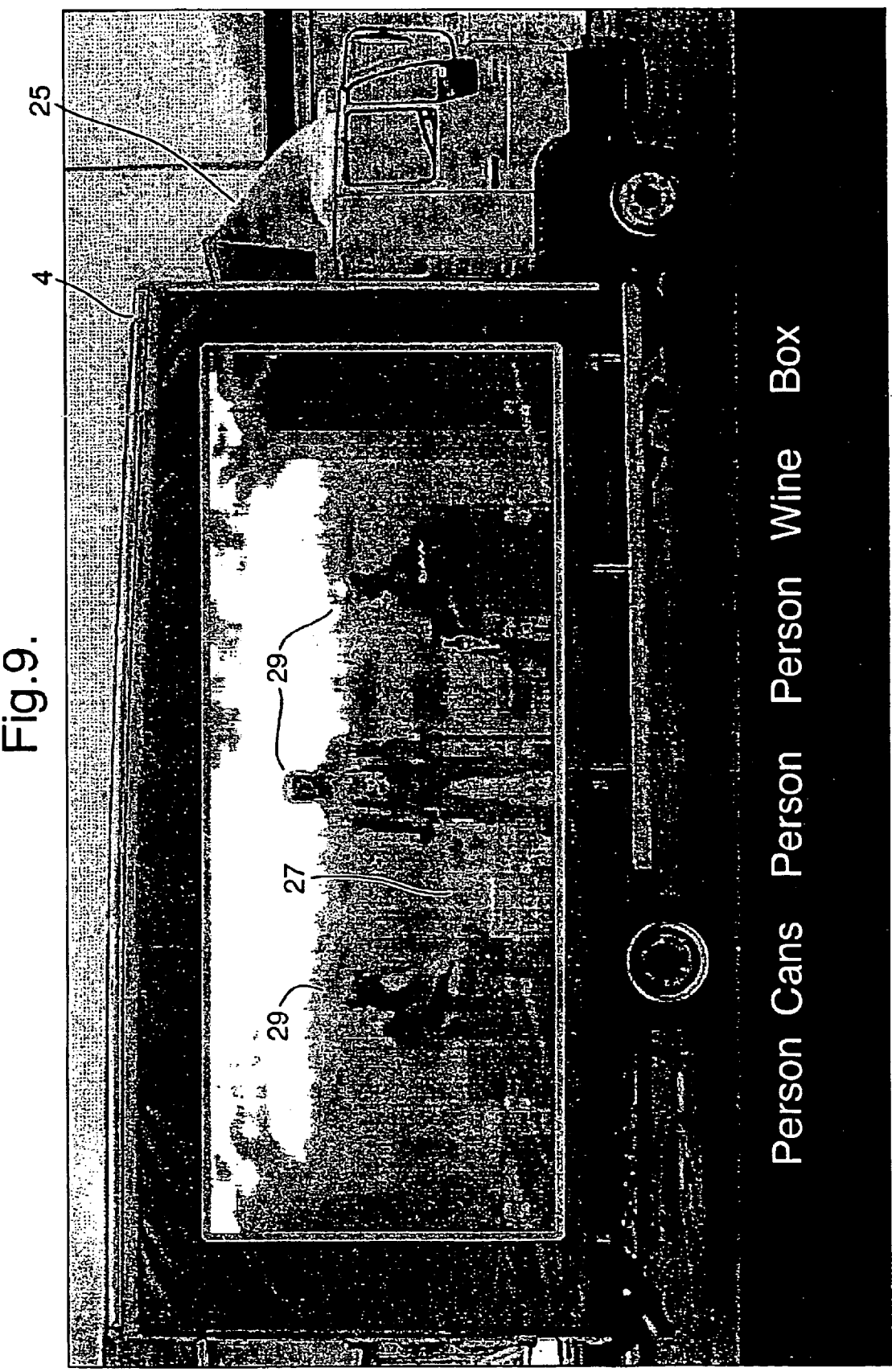

Cigarette cartons

Bottles
Cigarette cartons
Cans, Cigarette cartons

IMAGING SYSTEM AND METHOD

BACKGROUND OF THE INVENTION

1. Field of the Invention

This invention relates to a system and method for imaging the contents of containers. The invention more particularly concerns the imaging and detection of certain items which are hidden from view contained within the containers. The containers to which the invention relates will generally be mounted to a lorry or other vehicle, but they may also be standalone containers that are being carried on some other vehicle or moving platform, such as a train. The invention is particularly aimed at the detection of smuggled contraband through ports and across borders.

2. Discussion of Prior Art

The smuggling of contraband across borders has been going on for a great many years and much effort is put in by government bodies in an attempt to eradicate the problem. As fast as ways of countering the smuggling are found, the smugglers are adapting their methods to avoid capture. Ports are also becoming more busy as inter state trade increases, which exacerbates the problem. Items such as cigarettes and alcoholic drinks are often targeted by the smugglers in an attempt to avoid the duty payable on such items. More recently, there has been a growth in the smuggling of illegal immigrants across borders.

Methods of detecting such contraband do exist. Sniffer dogs can be used to great effect in an open truck to find humans, and manual searching can be used to find alcoholic drinks and cigarettes. Either method is very time consuming as a truck needs to be opened to be searched, resulting in either long delays whilst all trucks are searched, or running a great risk of missing some contraband by only selecting certain trucks for searching.

Another method used to find human cargo is to push a $CO_2$ sensor into the container volume and measure the quantities of the gas present. A high reading will be taken as being suspicious, and a final manual check can then be carried out. This is quicker than the previous method as not every truck is opened, but suffers from the disadvantage that it is not appropriate for all container types, as some don't have an opening suitable for insertion of the sensor. Again, the truck must be stationary for this to happen. The method is also of no use against cigarettes or alcohol.

Another method that has been recently used is to image the container using a large X-ray machine. This can provide a relatively clear picture of the contents of the container, but does suffer from some disadvantages. Firstly, current systems take a few minutes to produce a final image of the contents, leading to the delays discussed above. Secondly, the scanning process is also relatively slow, and the lorry must be stationary whilst the scanning is carried out. Thirdly, by the very nature of X-rays, there is some perceived danger in being excessively exposed to them, so they are not suitable for the detection of human cargo.

SUMMARY OF THE INVENTION

It is the object of the current invention to alleviate at least some of the problems found with the prior art.

According to the present invention there is provided a system for imaging the contents of a container, the system comprising an imager arranged to receive millimetre wave radiation from a reception volume through a receive antenna that itself comprises at least one receiving element, wherein, in use, the container is moving relative to the receive antenna, the reception volume is positioned such that the relative movement causes the reception volume to move through the container; data from the imager is recorded as the reception volume moves through the container, and an image of the contents of the container is built up from the recorded data.

This invention allows the non-invasive imaging of the contents of soft sided containers. Millimetre wave images of people are very distinctive and can be readily identified by the operator. Bottles too may be distinguished, due to the absorption of the radiation by the liquid contained therein. It is not possible using this system to be sure of the contents of the bottle without opening the container, but suspicion may be aroused if bottles are observed in a container in which is not expected to see such bottles. The shape of the bottles may also give a clue as to the contents. Cigarettes are commonly stored and transported in boxes of a standard size. The foil wrapping used provides a distinctive image at millimetre wave frequencies, and so can readily be seen by an operator.

In the context of this specification, soft sided containers are those containers having at least one side substantially made of material relatively transparent to electromagnetic waves in the frequency range from approximately 10 GHz to around 400 GHz, and references to soft-sided containers should be construed accordingly. A soft sided material as per this specification may therefore be physically rigid. Of course, this side could be on the top of the container, and act as a roof, or could make up any significant portion of the surface area of the container. Materials that are sufficiently transparent in the frequency range of interest include, but are not limited to wood, cloth, many types of plastic such as PVC, glass fibre, and other glass reinforced plastics. A high proportion of containers fitted to vehicles are made of such soft materials.

The containers primarily aimed at in this specification are the containers commonly found built into lorries or large vans. However, they may also be stand-alone containers that may be moved easily between different forms of transport such as lorries or train carriages, or other forms of transport. Preferably the receiver system is stationary.

Preferably, the receive frequency band of the system is chosen such that transmission of the electromagnetic radiation is not unduly hindered by atmospheric losses. Two bands that are particularly suitable are the Ka-band (26–40 GHz) and the W-band (75–110 GHz). In these bands the transmission through the atmosphere is better than at surrounding frequencies. This results in the sky appearing colder. Because much of the contrast in an image at these frequencies arises from reflection of cold sky seen against a warm background, the sky appearing colder causes the system dynamic range, and so image contrast, to be greater. Other suitable frequencies exist, particularly in the regions of 140 GHz and 220 GHz.

An advantage of the current invention is that the imaging process is done in real time. Thus, the image is built up as the container moves past the imager, and the image is presented to the user without there being a long delay while the image is processed. Therefore containers moving at their normal speeds within ports can be imaged without them needing to wait to get the "all-clear" signal The receiver can be positioned such that all trucks or other containers are arranged to pass through a portal, in which is mounted one or more receiver systems. The images produced can be scanned for any suspicious content and if anything worthy of further investigation is seen, the container can be isolated and searched, or details of it passed to a suitable authority.

The receiver system is arranged to focus on a part of the space within the container volume, and the movement of the container used to provide a "sweep" of other parts of the container as those parts move into the focus of the receiving system. Preferably the relative speed between the container and the receiver is known. If this is not the case, images can still be formed, but may appear either squashed or stretched, depending on whether the container is moving either slower or faster than expected. Objects having a known aspect ratio that appear in the image, such as any wheels that may be present on the container, can be used to re-scale the image back to the proper ratio. This is done by post-distorting the image such that the chosen item—such as a wheel—is back to the its correct shape. The rest of the image will then have the correct aspect ratio.

If the speed of the container past the system is known, then this speed can be input to the image generation software and used to scale the image appropriately. Alternatively, the speed can be controlled, either with speed restriction notices or by using some sort of conveyor system. This speed will then be taken into account when producing the final image.

The millimetre wave receiving system employed in the current invention is passive, in the sense that no radiation needs to be transmitted towards the target to produce an image. The resolution obtainable by the receiving system is limited by the wavelength of the radiation being picked up by receive elements within the receiver. Shorter wavelength radiation therefore can produce a more detailed image, but at the cost of having a smaller solid angle of view for each receiver element.

The resolution obtainable with the system is also determined by its exact configuration. The receiver system may comprise a set of one or more receiving elements, each of which record data from an elemental volume, whereby the contributions from each element are combined to form an image. Each element comprises a receive antenna that provides an electrical signal. This signal may then be amplified and/or downconverted before being detected using standard techniques for the frequencies concerned. The detected signal is fed into a signal processing system that is able to process this data to produce an image representative of the contents of the container.

Preferably, the receiver system comprises a scanning system, allowing the elemental volume seen by each receiving element to be swept across a region, allowing for fewer receiving elements to be employed within a receiver, and a greater total volume of the container to be imaged. The scanning system may be electronic or mechanical. The volume as seen by a receiver in focus is known as the reception volume. This is the summation of the elemental volumes. For a scanned system, the reception volume is that volume scanned by the summation of the elemental volumes over a single scan period. If more than one receiver element is employed in the system, then preferably they are arranged such that each receive radiation from different parts of the reception volume. In this way, the reception volume may be increased by increasing the number of receiver elements.

The reception volume may also be increased by increasing the effective depth of field of the receiver system. One way of doing this is to provide additional layers of receiving elements within the receiver that have their optimal point of focus offset by some distance from the first layer. The first layer will be arranged, given the characteristics of the scanning system, to be in the focus of millimetre wave radiation emanating from some plane. One or more additional layers may be arranged to receive radiation from different planes to that of the first layer. These additional layers can contain one or more receiving elements. A second, or further layers, will mean that at all but the foremost layer will be partially obscured by the other layer(s) of elements, and their supporting electronic and mechanical systems, that lie in the optical path. This puts a practical limit on the number of layers that can be used to increase the effective volume of the reception volume since, as would be appreciated by a person skilled in the art, it is good practice to have no more than 10% obscuration of the incoming optical beam.

It is acceptable, for systems that incorporate a scanning mechanism, to have areas in the scan pattern from which no radiation can be received and hence no image data taken. This is because the movement of the container relative to the measurement system provides that the items in the container that are in this area during one cycle of the scanner system will be in the reception volume in some future cycle. If the scan is a conical, then for a single receiving element the reception volume will resemble a toroid.

Whilst image data is being taken, the container will be moving relative to the scanner, as mentioned above. Preferably, the reception volume is arranged to lie in the container in a manner that uses the movement of the container to maximise the total swept volume.

The portal may be arranged so that the container can be imaged on more than one side simultaneously. A plurality of receiver systems can be mounted to image the container from different viewpoints, and could be arranged to provide separate images, or the images could be combined into one or more composite images. For example, a portal may comprise of a gate through which a containerised lorry passes. On each side of the gate there may be mounted a receiving system of the type herein described. One may also be mounted above the gate and arranged to look down on to the container. In one possible implementation, the reception volumes of each of these receivers are arranged so as to not overlap with each other. Thus the combined reception volume from all receiver systems is maximised, ensuring that more of the contents of the container can be visualised. However some of the objects inside the container to be imaged may be obscured by non-transparent objects to one side or above them, and so there is an advantage to be gained by having each receiving system imaging as much of the volume in the container by itself in order to minimise the probability that an object cannot be imaged. In this case, the reception volumes from the different receivers would overlap each other, providing differing views of the same image space.

The raw image data from each of the receiver systems can be viewed by an operator, or the images can be fed into an image processing circuit that can provide some analysis of the image. For example, image recognition software may be employed that can recognise certain elements that are present in the image data, based on pre-stored image data from items that are of interest to the operators of the system. These pre-stored images may be correlated with the live image using known techniques to aid the automatic recognition process. The image recognition software may highlight on the raw display areas where it has detected potential items of interest. An alarm may be triggered to draw the user's attention if items of interest are found.

Images from a plurality of receiver systems, and hence a plurality of reception volumes can be combined to improve the information content within the viewed image. A single receiver system sees a given part of the container from a series of different angles as that part of the container moves through the reception volume. This additional information can be used to provide enhanced images. For example, different images, equating to views from different angles of the container volume can be produced, and these images displayed in sequence to the user to give a view around objects. Advantageously, different images of the container can be presented to each eye of the user, allowing him to see a stereoscopic view of the container contents. The stereo images can be viewed using the standard techniques, such as red/green spectacles, horizontal/vertical polarisation spectacles, or splitting the field of view, such that one eye can only see one image and the other eye can only see the other one. Preferably, data from a plurality of receiver systems is combined to produce the image or images.

Consideration needs to be given to selecting certain system parameters to ensure satisfactory performance of the system.

The system resolution, or spot size, should be chosen so that enough detail of the expected contraband can be seen. The resolution of the system is determined by the frequency band of operation, and by the antenna size. At Ka or W-band, resolution better than 200 mm, such as better than 100 mm, such as better than 50 mm, such as better than 20 mm may be obtained in a practical system. Having finer resolution improves the images but requires more receiver elements and more signal processing power.

According to another aspect of the invention there is provided a method of imaging the contents of a container where the container is moving relative to a receive antenna of the imaging system, characterised by:
  arranging an imager to receive millimetre wave radiation from a reception volume through the receive antenna that comprises at least one receiving element;
  positioning the reception volume such that the relative movement causes the reception volume to move through the container;
  recording data from the imager as the reception volume is moved through the container;
  compiling an image of the contents of the container from the data.

BRIEF DESCRIPTION OF THE DRAWINGS

Embodiments of the present invention will now be described, as applied to the detection of contraband in a containerised lorry, by way of example only, with reference to the following illustrative drawings, in which:

FIGS. 9, 10 and 11 show some typical images that are obtainable

DETAILED DISCUSSION OF EMBODIMENTS

Figure 1:
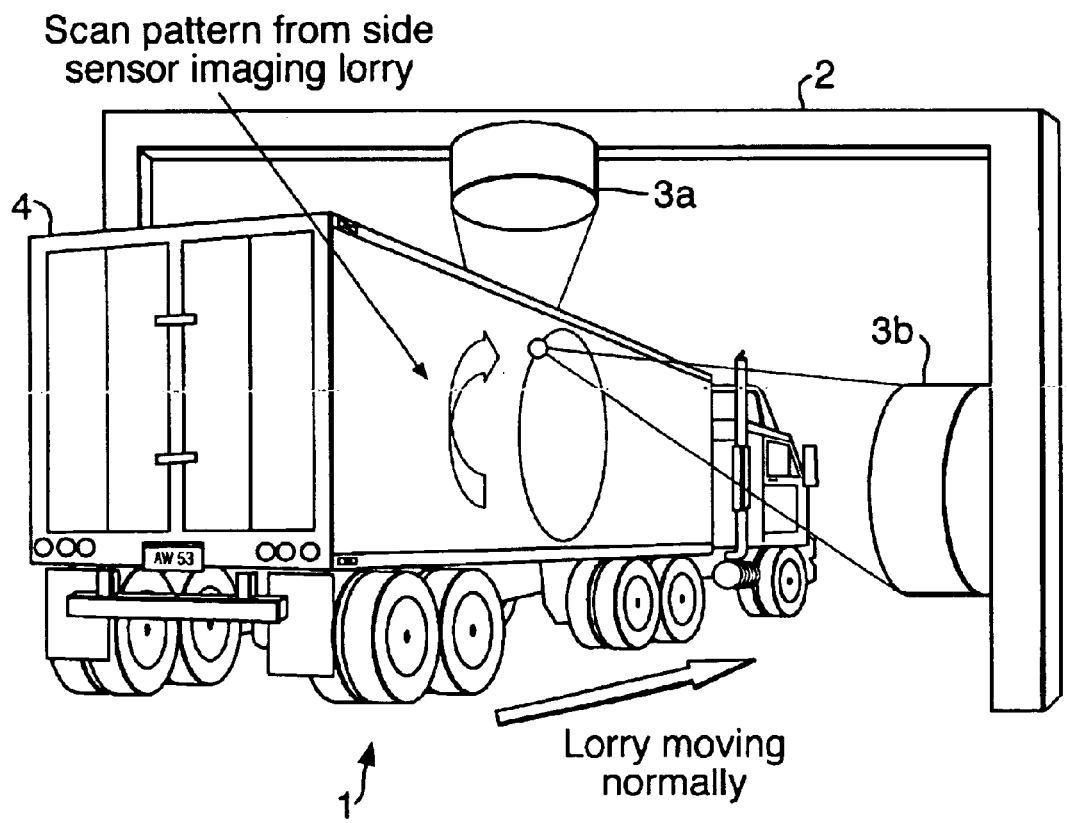
FIG. 1 diagrammatically illustrates a lorry passing through a portal and being scanned by millimetre wave receivers.

FIG. 1 shows a containerised lorry (1) passing through a portal (2) which has been fitted with passive millimetre wave receivers (3) according to the current invention. Two receiver systems are shown, one (3b) looking into the side of the lorry's container (4), and the other (3a) looking through roof of the container (4). A third may be fitted to look through the other side, but this is not shown.

A portal (2) such as the one shown provides a convenient means of checking the lorries coming from, for example, a port, as there is no need for the lorry to stop whilst it is being checked.

Figure 2:
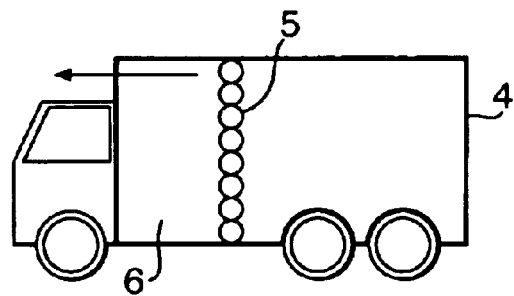
FIG. 2 diagrammatically illustrates one type of receiver system that may be used.

One option for a receiver configuration suitable for implementing the current invention is illustrated in FIG. 2. This shows the scan pattern that would be produced by having a linear array of receiving elements each receiving from an elemental volume (e.g. 5), and the combined elemental volumes making up the reception volume (6). If enough receiving elements were used, then the full height of the container (4) can be viewed, and as the lorry drives forward the reception volume (6) gets to do a sweep along the length of the container (4). The resolution of the system is directly related to the "spot" size, defined as the diameter of the half-power beamwidth of the optics point spread function in the plane of focus in the container. Decreasing the spot size allows better quality images, with a finer pixel size, but means increasing the number of receiving elements, which adds to the system cost.

Figure 3:
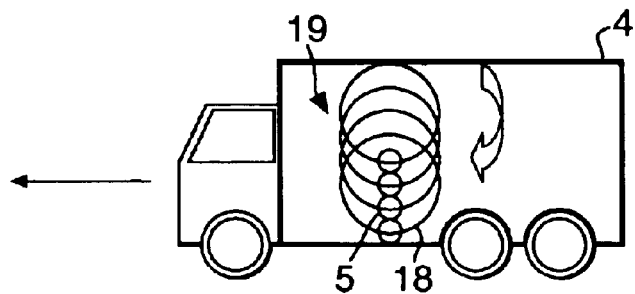
FIG. 3 diagrammatically illustrates a second receiver architecture that may be used.

An alternative receiver configuration is indicated in FIG. 3. This shows the result of taking a small linear array of the type shown in FIG. 1 and mechanically or electronically scanning each of the elements' field of views (5) to provide a greater area of coverage (18). This leads to a greater reception volume (19). The scan pattern can be anything suitable, such as raster scan or, as shown in the figure, a conical scan pattern. By scanning the available receiving elements across a wider area in the manner shown the number of receiving elements needed is reduced. A conical scan needs half as many elements as the straight linear scan to cover the same height, which reduces the system cost. However, more complex image processing is needed on the receiver outputs before an image can generated, and the scanning system itself will add complexity. A conical scan such as this however allows the container contents to be viewed from different angles as the contents pass through different parts of the reception volume. A suitable scanning receiver system for this, which uses a mechanical conical scanning mechanism is described in an earlier patent application (publication number WO00/14587), the contents of which are hereby included by reference.

Figure 4:
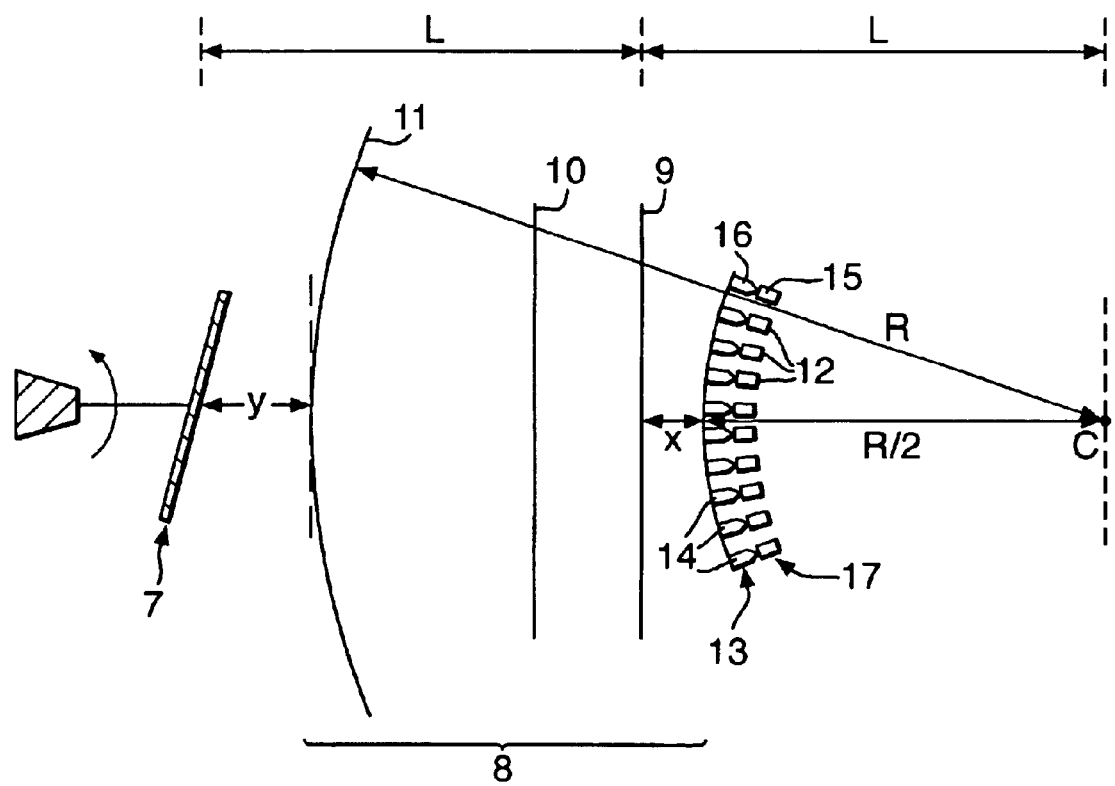
FIG. 4 diagrammatically illustrates a detailed view of such a receiver being used.

FIG. 4 shows a sectional view of such a receiver system. It comprises a rotatable reflective plate (7) having an axis of rotation passing through the centre of its surface and a lens arrangement (8) for selectively transmitting and focusing radiation having a particular direction of polarisation.

The lens arrangement (8) comprises a first polarising element (9) having a substantially flat surface, a second element (10) for rotating the direction of polarisation of radiation through substantially 45° and a third polarising element (11) having a substantially spherical surface having a centre of curvature, C, and having a radius of curvature of R, wherein the third polarisation axis makes an angle of substantially 45° with the first polarisation axis. The axis of rotation of the plate (7) passes through the centre of curvature, C, and the separation of the first polarising element (9) and the centre of curvature, C, along the axis of rotation and the separation between the first polarising element (9) and the plate (7) along the axis of rotation are substantially equal. The apparatus also comprises at least one receive element in the form of a feed horn (16) and may comprise a plurality of feed horns (14) so as to form an array (13), the feed horns (14) forming part of a spherical surface having a radius of curvature substantially equal to R/2 and being concentric with the third substantially spherical polarising element. The apparatus may further comprise at least one detector element (15), or an array of such detector elements (17). Alternatively, the detector elements (15) may be mounted remotely to the apparatus, and connected thereto by suitable connectors. The apparatus provides the advantage that optical aberrations in the image formed at the detector array (12) are minimised.

Figure 5:
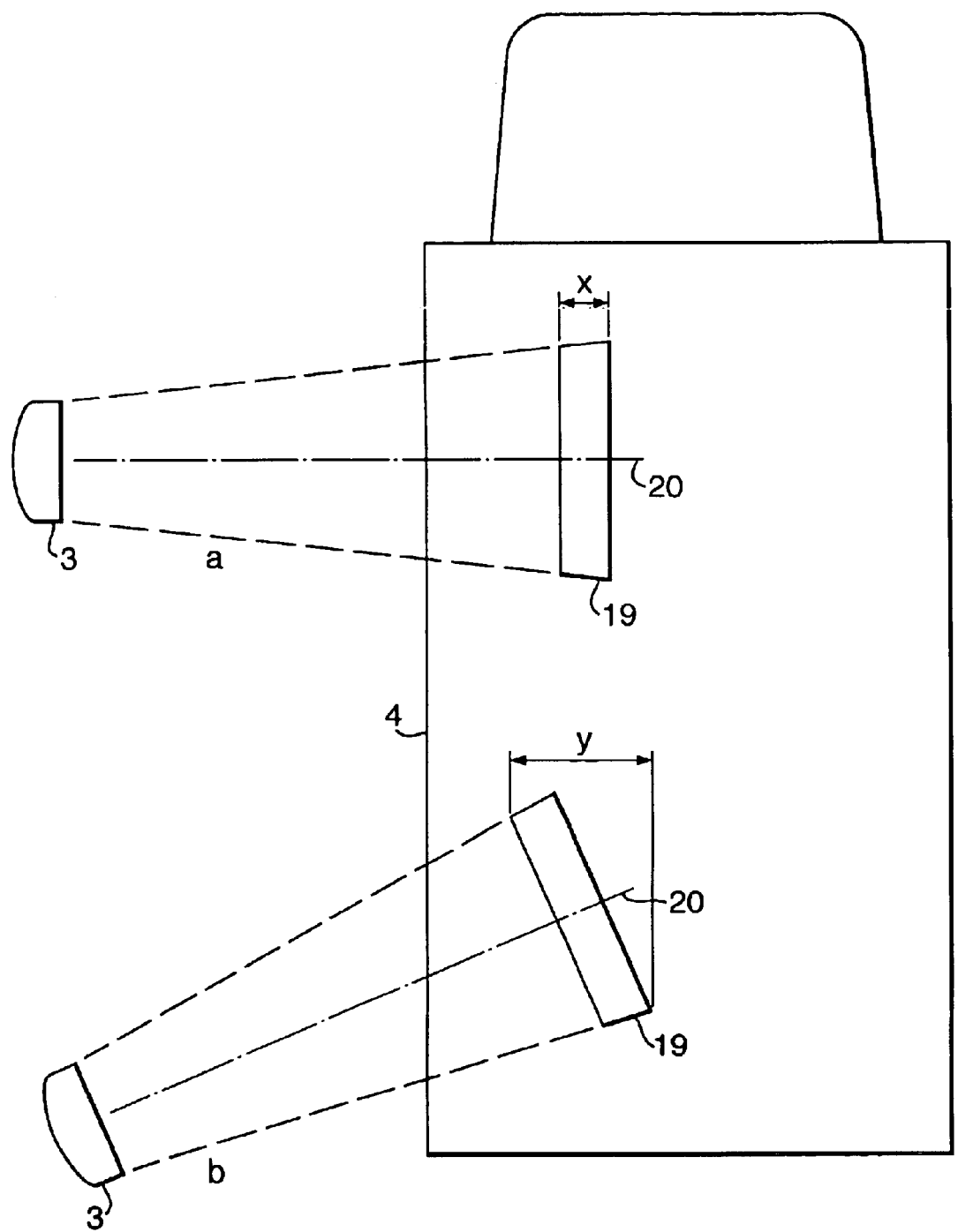
FIG. 5 diagrammatically illustrates how the volume in the container may be more effectively imaged using a scanned receiver.

It is apparent from FIG. 3 that the reception volume (19)—resulting from the field of view and depth of field in the system—in the scanned system is much wider than in the linear array. This width can be used to further advantage FIG. 5a shows a plan view of a scanning receiver (3) that is looking into the side of a container (4). The reception volume (19) is shown occupying a portion of the container (4). As the container (4) moves, the reception volume (19) will be swept down the length of the container, so scanning those parts in its path. However, in this example a large portion of the container (4) does not get scanned. If the axis (20) of the receiver (19) is offset from the normal to the direction of movement of the container (4), this will have the effect of skewing the reception volume (19) as shown in FIG. 5b. The reception volume (19) will then have parts that extend further into the container (4) as compared to the arrangement of FIG. 5a. Radiation received from these parts of course contribute to the overall image data set obtained from the container (4) so that, as the lorry passes, a much greater volume (proportional to y/x) of the container (4) can be scanned, leading to a greater likelihood of detecting the presence of contraband.

Figure 6:
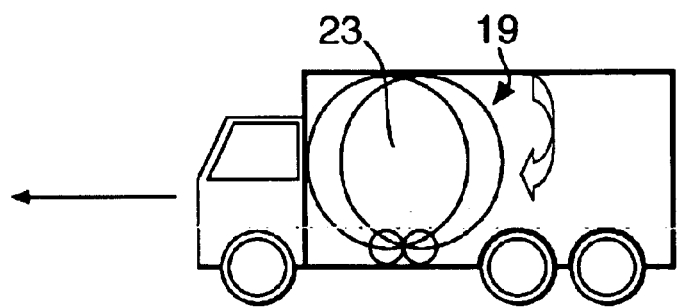
FIG. 6 diagrammatically illustrates a third receiver architecture that may be used.

A further embodiment of a receiver particularly suitable for carrying out the current invention is shown in FIG. 6. This receiver has at least one receiving element that is scanned in a conical pattern. The height of the reception volume (19) is preferably arranged to be similar to the height of the container (4) being scanned. It can be seen from the Figure that there is a "blind" space (23), from where no energy will enter the receiving elements. If the container (4) were to remain stationary then this blind space (23) could never be imaged. But, as the container is moving, items within this blind space (23) will eventually pass into the scanned region and so be imaged. The particular embodiment allows for a much greater effective reception volume (19) for a given number of receive elements, giving scope for making the height of the reception volume (19) the same as the height of the container (4) being examined. In this case, as the lorry moves past the receiver, radiation from the whole side of the container (4) will be imaged.

There are constraints that need to be imposed on such a system if it is to work well. The relationship between the speed of the passing lorry and the scanning speed need to be such that all parts of the container are sampled sufficiently for a satisfactory image to be produced. To avoid slowing the lorries down as they pass the receiver, the scan speed of the receiver can be increased. However, if the speed is increased too much then the dwell time of the receiving element on a given portion of the container volume may be too small to allow an adequate signal to noise ratio, and hence prevent adequate imaging to take place. A solution to this problem is shown in the figure. Placing a plurality of receiving elements along the same axis as the lorry's direction of travel allows the rotation speed of the scanner to be reduced without sacrificing image quality.

The latter embodiment results in the fewest total number of receivers for a given system, but more processing of the received signals is necessary in order to build up a complete image.

For example, using the system illustrated in FIG. 3, a single scan takes data from the whole of the reception volume, which is then processed to form an image of the reception volume. Where parts of the container volume are scanned more than once, the additional data from the extra scans can be used to improve the image for those parts of the container. The system as illustrated in FIG. 6 cannot build up a complete image in a single scan, due to the unscanned volume that exists during a single scan operation. The image is instead built up in an unconventional manner, with parts of the data from a first scan cycle stored in digital memory whilst subsequent scans produce data to fill the gap in the image.

The scan speed must also be slow enough for the scanning system to be practicable from the mechanical viewpoint. An approximate guide, or rule of thumb, that ensures this is satisfied on current embodiments is to keep the product of the frame rate (i.e. the inverse of the rotation time) and the scan aperture not greater than 15 ms$^{-1}$. Images can still be produced if this figure is exceeded, but may be of a lesser quality.

System parameters have been calculated based on the three embodiments discussed above, using the following assumptions:

Antenna temperature 290K worst case;
Receiver noise temperature 400K;
Receiver bandwidth 14 GHz; (to detector)
Optics transmission would be 0.5;
Speed of container relative to antenna: 20 mph;
Container dimensions 3.4 m tall by 2.5 m wide. The length is of course not relevant, as longer containers will simply result in a wider image;
container to pass through a portal having one receiver antenna on each side of the portal and one on top;
Portal at 5 m range from focussed position (typically centre of container);
Ka (30 GHz) and W (90 GHz) bands considered;
20 mm, 50 mm and 100 mm spot size evaluated;
Frame rate adjusted on the embodiment of FIG. 6 by increasing receiver numbers to allow mechanical feasibility.

Using a linear array of the type shown in FIG. 2 gives

TABLE 1

| Desired spot size/ mm | Frequency/ GHz | Aperture/ m | No of Receiver elements | Thermal sensitivity/ K |
|---|---|---|---|---|
| 20 | 90 | 1.01 | 930 | 0.35 |
| 50 | 90 | 0.40 | 372 | 0.22 |
| 100 | 90 | 0.20 | 186 | 0.16 |
| 20 | 30 | 2.78 | 930 | 0.35 |
| 50 | 30 | 1.11 | 372 | 0.22 |
| 100 | 30 | 0.56 | 186 | 0.16 |

Using the scanned system as illustrated in FIG. 3 gives:

TABLE 2

| Spot size/ mm | Frequency/ GHz | Side frame rate/Hz | Top frame rate/Hz | Aperture/ m | No of Receiver elements | Side Thermal sensitivity/ K | Top Thermal sensitivity/ K |
|---|---|---|---|---|---|---|---|
| 20 | 90 | 5.3 | 7.1 | 1.01 | 465 | 0.62 | 0.62 |
| 50 | 90 | 5.3 | 7.1 | 0.40 | 186 | 0.39 | 0.39 |
| 100 | 90 | 5.3 | 7.1 | 0.20 | 93 | 0.28 | 0.28 |
| 20 | 30 | 5.3 | 7.1 | 2.78 | 465 | 0.62 | 0.62 |
| 50 | 30 | 5.3 | 7.1 | 1.11 | 186 | 0.39 | 0.39 |
| 100 | 30 | 5.3 | 7.1 | 0.56 | 93 | 0.28 | 0.28 |

Using the scanned system as illustrated in FIG. 6 gives:

TABLE 3

| Spot size/ mm | Frequency/ GHz | Side frame rate/Hz | Aperture/ m | Rx per array | Total no. of Receiver elements | Side Thermal sensitivity/ K | Top Thermal sensitivity/ K |
|---|---|---|---|---|---|---|---|
| 20 | 90 | 14.9 | 1.01 | 60 | 180 | 1.48 | 1.26 |
| 50 | 90 | 35.7 | 0.40 | 10 | 30 | 1.45 | 1.24 |
| 100 | 90 | 59.5 | 0.20 | 3 | 9 | 1.32 | 1.13 |
| 20 | 30 | 5.4 | 2.78 | 166 | 498 | 0.89 | 0.76 |
| 50 | 30 | 13.2 | 1.11 | 27 | 81 | 0.88 | 0.75 |
| 100 | 30 | 25.5 | 0.56 | 7 | 21 | 0.86 | 0.74 |

In these tables, the spot size is the half power beamwidth of the antenna system, as measured at the focal distance. The top and side frame rates are rotation rates of the scan mechanism for the antennas looking into the top of the container and looking into the side of the container respectively. The aperture is the optical aperture of the antenna system. The thermal sensitivity is the system noise level.

It can be seen that the latter embodiment uses the least number of receiver elements in most cases, thus in general will be preferred in terms of cost. Noise performance, although not as good as the other systems, is satisfactory, as the contrast in a lorry container has been measured, and is of the order 60K, giving a signal to noise ratio of 16–19 dB or so.

The depth of field (DOF) obtainable by these systems again varies according to desired resolution and frequency of operation. If s is the spot size and λ is the operating wavelength, from diffraction theory, $$DOF \approx \frac{1.34 s'}{\lambda}$$

Figure 7:
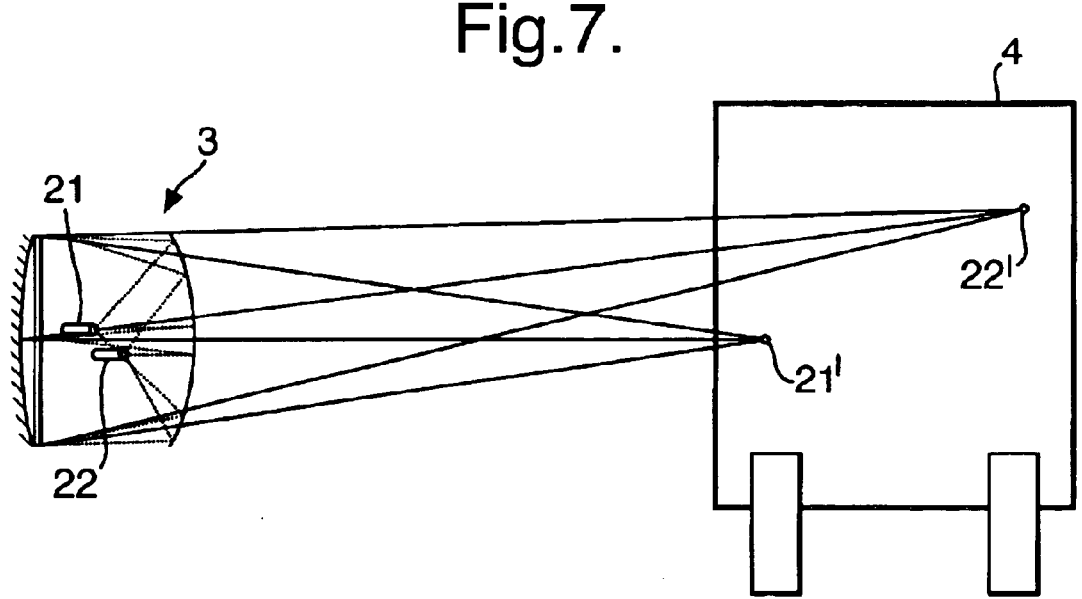
FIG. 7 diagrammatically illustrates the use of multiple focus techniques to increase the depth of field seen by the receiver.

In practice the useable DOF without unduly compromising image quality is around four times greater than that predicted by the above equation. In many circumstances the DOF may be such that not all of the inside of the container is visible, even when viewed from both sides and from above. To counter this, an embodiment shown in FIG. 7 has two layers of receivers (21,22) arranged at different focal positions within the receiver system. Thus, two different distances (21', 22') will be in focus at any one time, and twice the volume of the container (4) can be seen at any one time. Although shown on a scanning receiver, the method is equally applicable to a fixed view receiver such as that shown in FIG. 2.

For satisfactory imaging, there is a limitation on the speed at which the container can pass the receiver. The speed should be sufficiently low such that successive cycles of the scan system can sample the radiation at a suitable rate, so that all gaps—if any—in the scan pattern during one cycle are sampled during further (or previous) scan cycles. Given a spot size s (half-power antenna beamwidth), a scan rate F, an array of n receive elements along the direction of movement and a vehicle speed u, then $$\frac{1}{F} \leq ns/2u$$

to ensure sufficient sampling to meet the Nyquist criteria. It will be seen that adding more receiving elements to form a linear array along the axis of the movement of travel will ease the restrictions on the vehicle speed and also the scan cycle time.

The integration time must also be sufficient to give an adequate signal to noise ratio. The integration time is given by (for a conical scan pattern)

$$\tau = \frac{s}{2 \cdot \pi \cdot HF}$$

for a receive system looking over a conical scan pattern of height (i.e. diameter) H in the plane of focus in the container.

The system thermal sensitivity will be given by $$\Delta T_{min} = \frac{1}{\eta} \cdot \frac{T_a + T_R}{\sqrt{\beta \tau}}$$

where $T_a$ is the antenna temperature, $T_R$ is the receiver noise temperature, $\beta$ is the receiver bandwidth and $\eta$ is the transmission efficiency of the optics.

Using assumptions given above, namely, an antenna temperature of order 290K worst case, receiver noise temperature of 400K, a bandwidth of 14 GHz, and a value for the optics transmission of 0.5, then $$\Delta T_{min} \approx \frac{0.0117}{\sqrt{\tau}}$$

Figure 8:
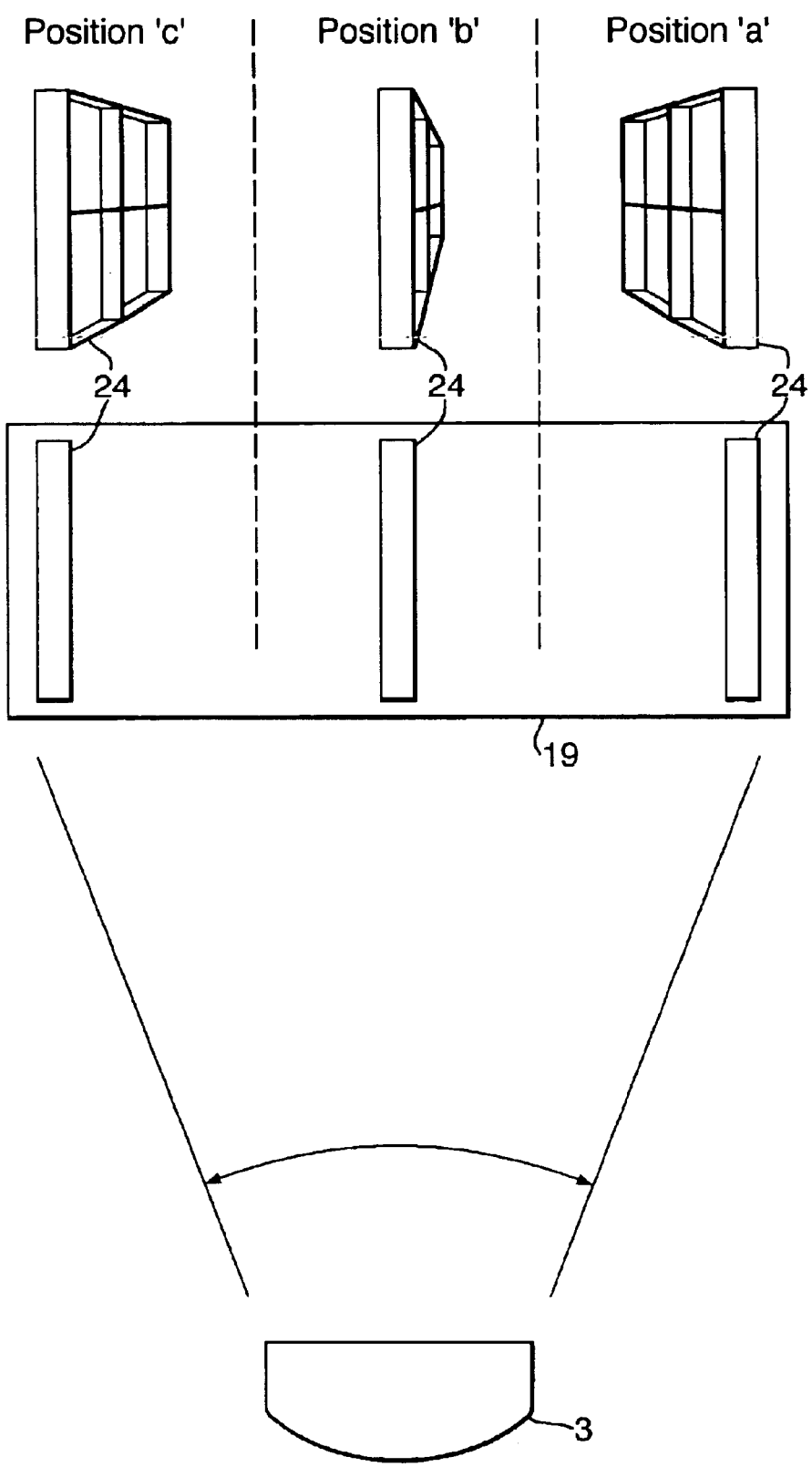
FIG. 8 diagrammatically illustrates how three dimensional information can be recorded with the current invention.

The scanned embodiments have an angular field of view across which an image is formed. As items move across this field of view, multiple samples of the items are taken. This leads to the ability to create images that may be presented to the user or to an image processing system that comprise views of the container contents from different angles. FIG. 8 shows this in more detail. The lower portion of the Figure shows a plan view of a scanning receiver (3) receiving data from a reception volume (19) at different times corresponding to the different positions of a frame (24) passing through the reception volume (19). The upper portion shows the perspective view of the frame (24) as it would be seen from the receiver (3). The frame (24) enters the reception volume (19) from one side (position a) due to the movement of the container. The perspective view shows that the left side of the frame is first seen by the system. As the frame (24) passes through the reception volume (19) it is seen from different angles as shown (positions b and c). The embodiment of FIG. 6 may not show a complete view of the frame (24) in position b, as parts of the frame may be in a blind area of the scanner. Views a and c will be seen however. The multiple views provide extra information that may be used to help identify the container contents. The user can switch to whatever view he thinks will be clearest. The contents can even be viewed stereoscopically, to provide a three dimensional image to the user. Here, the term stereoscopic encompasses any means of display wherein differing views of a scene are presented to each eye, such that some perception of depth may be represented to the viewer. Such visualisation methods include providing image pairs, each image of the pair being in some way orthogonal with respect to the other in terms of light polarisation, colour, etc., and providing the user with glasses that pass respective images to each eye. Other visualisation methods exist that are suitable for use in the present invention.

Figure 10A:
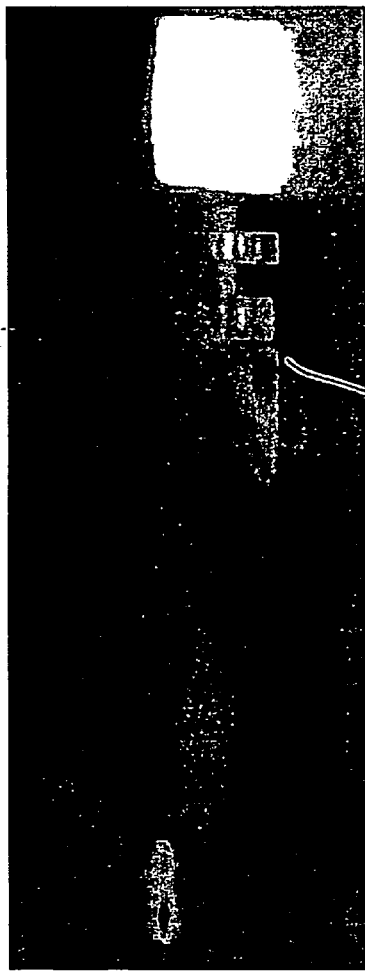
Figure 10B:
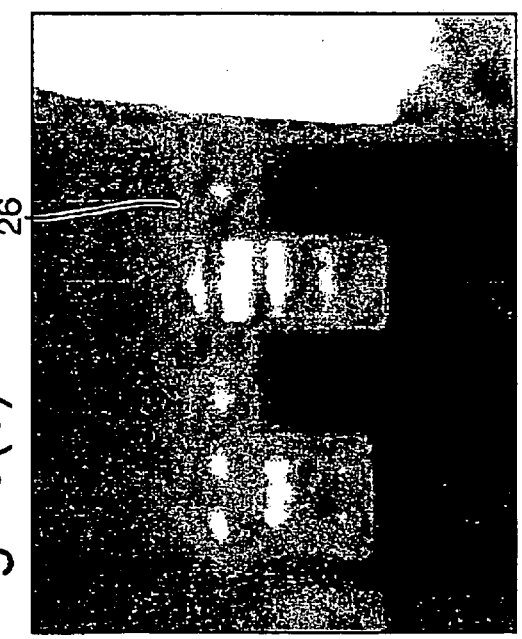
Figure 10C:
Figure 11:
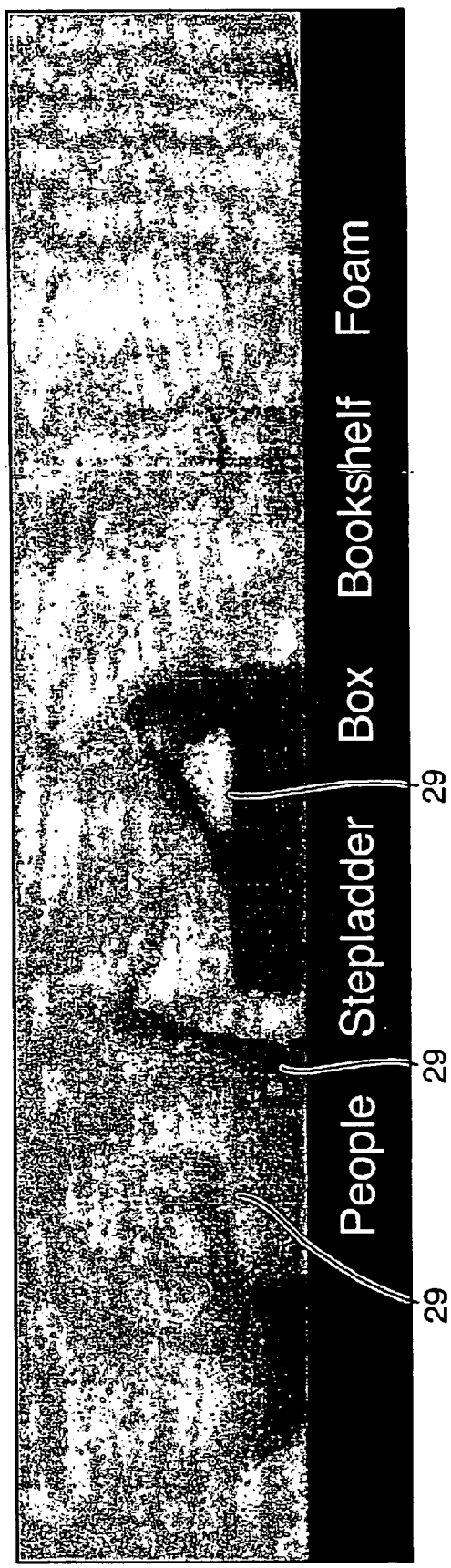

FIGS. 9 to 11 show some examples of images that can be obtained in accordance with the current invention. FIG. 9 shows a lorry (25) photographed in normal light. The side of the container (4) on the lorry is made of plastic sheeting. Inset into this is an image taken using a system setup as per the embodiment shown in FIG. 3. Three people (29) can readily be identified, as can the cans of drink.

FIG. 10 shows three images taken using the embodiment shown in FIG. 3. In a) some cigarette cartons (26) can be seen towards the right of the picture, with the detail of these shown at b). c) shows another image with cans (27), cigarette cartons (26) and bottles (28) in view. Although it is sometimes not very clear what the images represent, the skilled observer will be more familiar with interpreting the images and will have a better idea as to what to look for.

FIG. 11 shows various objects in a container viewed with a system according to the embodiment shown in FIG. 6. People (29) are clearly visible, and other objects can also be seen.

The skilled person will be aware that other embodiments within the scope of the invention may be envisaged, and thus the invention should not be limited to the embodiments as herein described.

What is claimed is:

1. A system for imaging the contents of a container, the system comprising:

an passive imager responsive to received millimetre wave radiation from a reception volume, said imager including at least one receive antenna, wherein the reception volume is smaller than an internal volume of the container, and there is relative movement between the container and the reception volume such that the reception volume moves through the container;

a computer system for recording data relating to said received millimetre wave radiation from the reception volume at a plurality of different times during the relative movement between the reception volume and the container, and for combining the data and producing a composite image of the contents of the container; and speed measurement equipment for measuring the speed of the container relative to the receive antenna during at least part of the data recording, and the speed measurement is used as a parameter when creating the composite image.

2. A system as claimed in claim 1 wherein the container is mounted on a vehicle.

3. A system as claimed in claim 1 wherein the imaging system is stationary and the container is moving.

4. A system as claimed in claim 1, further including processing means for re-scaling the image produced by the imager to bring the image of an item of known relative dimensionality into correct proportion.

5. A system as claimed in claim 1 where the speed of the container is controlled for the duration of data recording.

6. A system as claimed in claim 1 wherein said at least one receive antenna has an axis and the axis is not perpendicular to a direction of relative movement of the container and receive antenna.

7. A system as claimed in claim 1 wherein said at least one receive antenna comprises a plurality of receive antennas for gathering data from a plurality of reception volumes.

8. A system as claimed in claim 1 wherein the image may be manipulated to allow views of the container contents from different angles.

9. A system as claimed in claim 8 wherein the manipulation allows the user to view stereoscopic images of the container contents.

10. A system as claimed in claim 1 wherein said at least one receive antenna comprises a plurality of receiving elements arranged in an array.

11. A system as claimed in claim 10 wherein the plurality of receiving elements are arranged in a substantially linear array.

12. A system as claimed in claim 11 wherein the substantially linear array has a major axis parallel to the direction of relative movement between the container and the imaging system.

13. A system as claimed in claim 1 wherein said at least one receive antenna has a directional receive beam pattern and the reception volume is scanned by changing with time the direction of said receive beam pattern.

14. A system as claimed in claim 13 wherein the change in direction is effected by conically scanning the direction of each receive beam pattern.

15. A system as claimed in claim 13 wherein a focal plane of the reception volume viewed from the receive antenna comprises an area from which no radiation is received during a complete cycle of the scanning system that is completely surrounded by an area from which radiation is received during the scan.

16. A system as claimed in claim 10, further including a second array of receive elements displaced from the first array so as to receive energy from a different focal plane from the first array.

17. A system as claimed in claim 1 wherein the data is analysed by image recognition software that is pre programmed with images or characteristics of contraband items, such that when a match is found between the image data and at least one of the contraband items an alert is sent to an operator.

18. A method of imaging the contents of a container where the container is moving relative to a receive antenna of the imaging system, said method comprising the steps of:

arranging passive imager to receive millimetre wave radiation from a reception volume through the receive antenna;

positioning the reception volume such that the relative movement causes the reception volume to move through the container;

measuring the speed of the container relative to the imager at at least one point when the reception volume is inside the container;

recording data from the imager as the reception volume is moved through the container; and compiling an image of the contents of the container from the data, using the measured speed as a parameter.

19. A method as claimed in claim 18 where the receive antenna is arranged to be stationary, and the container arranged to be moving.

20. A method as claimed in claim 18 where the speed of the container is controlled for the duration the reception volume is inside the container.

* * * * *